May 19, 1942. H. E. HAWKINS, SR 2,283,436
COMBINED GUARD AND TOWING DEVICE
Filed Feb. 14, 1941 2 Sheets-Sheet 1
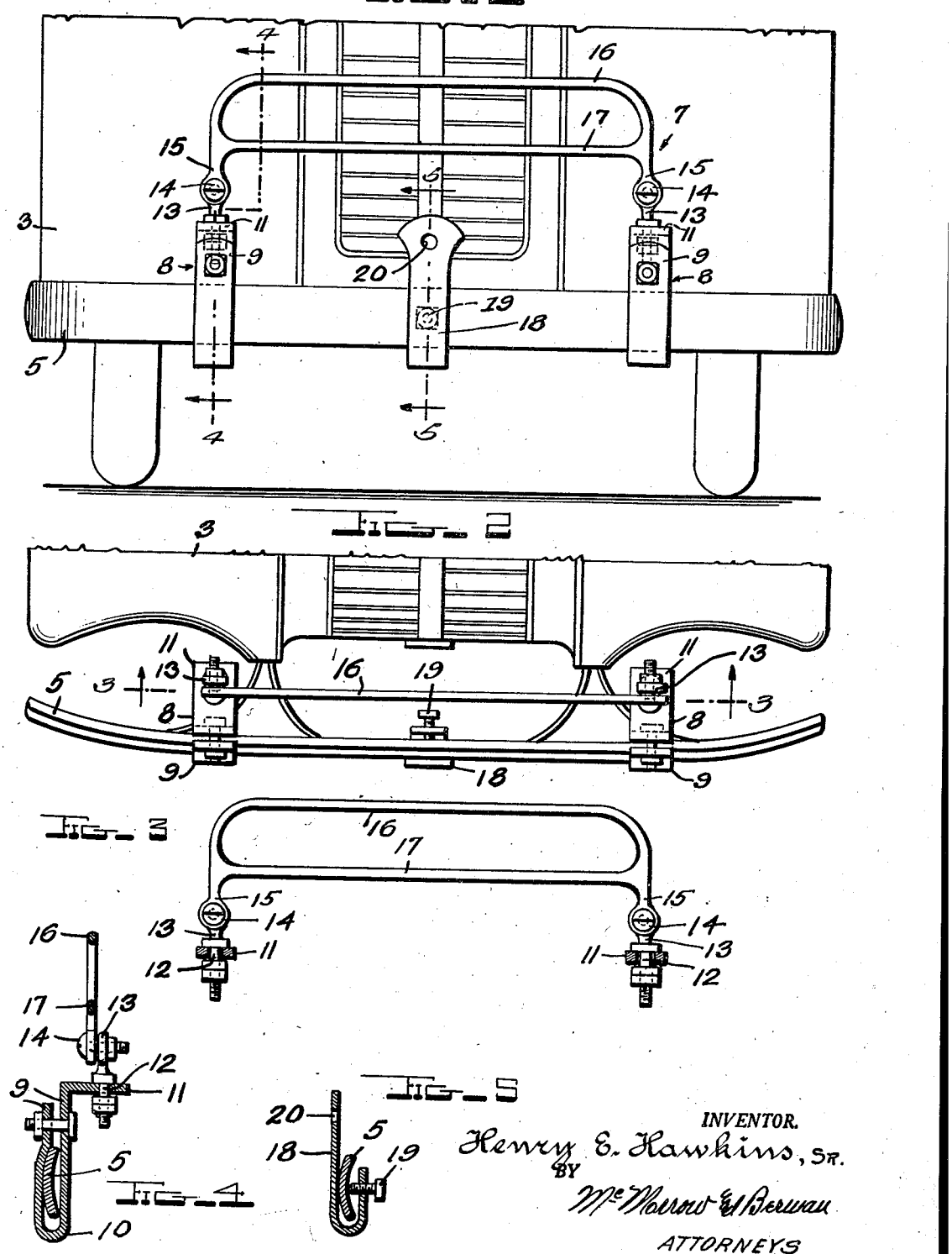
INVENTOR.
Henry E. Hawkins, Sr.
BY
McMorrow & Berman
ATTORNEYS May 19, 1942.    H. E. HAWKINS, SR    2,283,436
COMBINED GUARD AND TOWING DEVICE
Filed Feb. 14, 1941    2 Sheets-Sheet 2
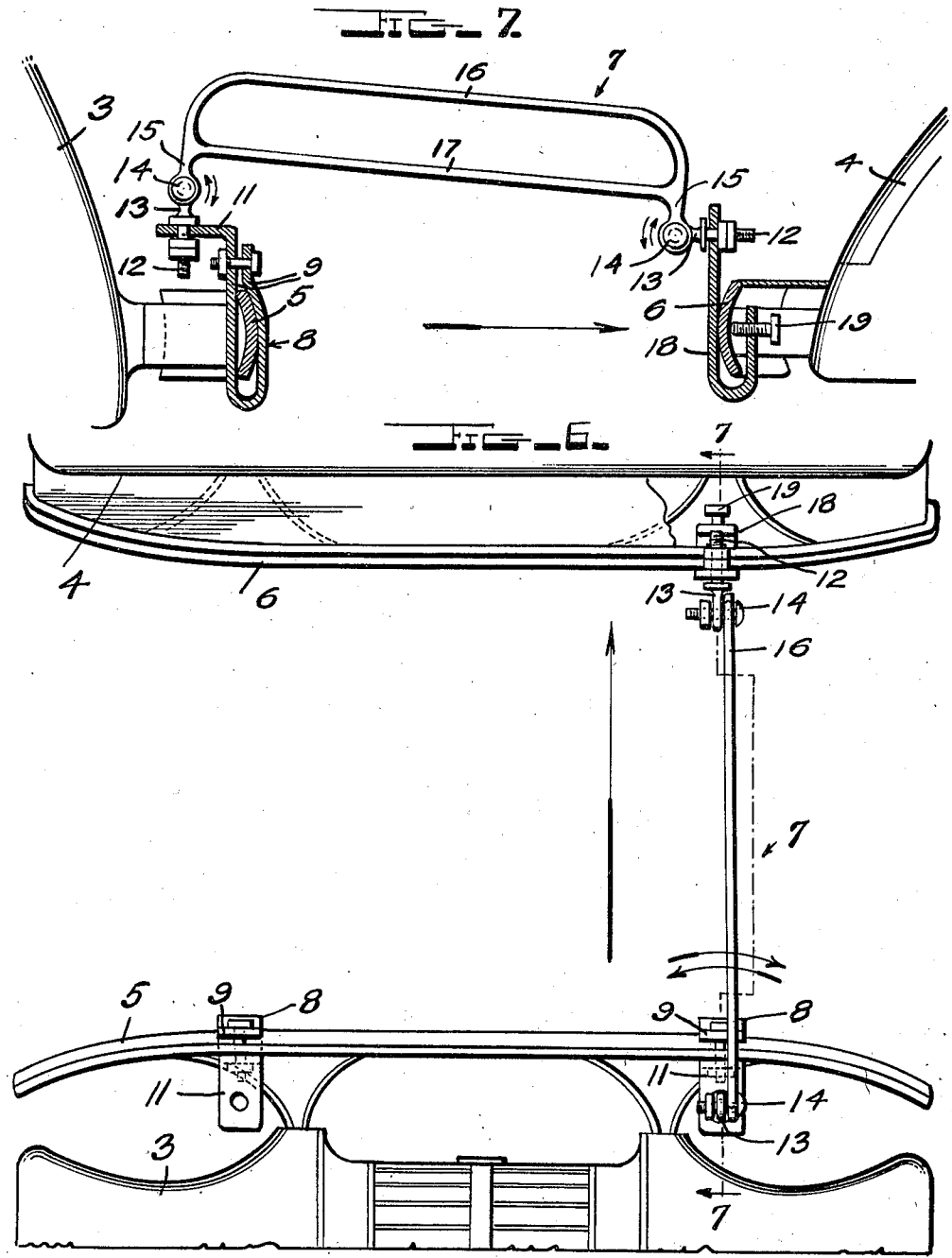
INVENTOR.
Henry E. Hawkins, Sr.
BY
ATTORNEYS Patented May 19, 1942

2,283,436

UNITED STATES PATENT OFFICE 2,283,436

COMBINED GUARD AND TOWING DEVICE

Henry E. Hawkins, Sr., Houston, Tex.

Application February 14, 1941, Serial No. 378,987

4 Claims. (Cl. 293—55)

My invention is directed to a combined bumper guard and towing device and which I term a tow guard.

One of the principal objects of my invention is to provide a device of the above described character so constructed and arranged whereby the same may be mounted on the bumper of a motor vehicle to protect the latter and which device is capable of being operated in a manner to effect connection with the bumper of an adjacent vehicle whereby one of said vehicles may be towed by the other.

An important object of my invention is to provide a device of the character described which is simple in construction, durable in use, efficient in operation and economical in manufacture.

Other objects and advantages will be apparent from the following description, appended claims and annexed drawings.

Referring to the drawings wherein like reference characters designate like parts throughout the several views:

Figure 1 is a front elevation of my invention in connected relation with a motor vehicle.

Figure 2 is a top plan view thereof.

Figure 3 is a detail sectional view of my invention taken on the line 3—3 of Figure 2.

Figure 4 is a detail sectional view taken on the line 4—4 of Figure 1.

Figure 5 is a transverse sectional view taken on the line 5—5 of Figure 1.

Figure 6 is a top plan view of the front and rear ends of a pair of motor vehicles respectively, said vehicles being connected together in towing relation through the medium of my invention.

Figure 7 is a sectional view taken on the line 7—7 of Figure 6.

In practising my invention, as illustrated in the drawings, I provide a pair of motor vehicles 3 and 4 provided with front and rear bumpers 5 and 6 respectively and with said front bumper 5, for the purpose of disclosure, being equipped with my combined bumper guard and towing device or tow guard 7, serving, as illustrated in Figures 1 and 2, to protect the front of the motor vehicle 3.

My device comprises a pair of spaced bumper clamps 8 and inasmuch as the clamps are of a substantially identical construction, a detailed description of one will suffice, it being understood, for the purpose of the description, that the reference numerals indicative of parts of one clamp are indicative of like parts of the other clamp. Each clamp is of a substantially U-shaped configuration provided with side arms 9 having their lower ends connected together by a loop portion 10 and said arms 9 receive therebetween the bumper 5. The upper ends of the arms 9 are connected together by means of a bolt and nut whereby said arms are secured in clamped relation to the bumper 5.

The upper end of the rearwardly disposed arm 9 of each clamp 8, is formed with a right angularly and rearwardly extending end section 11 having pivotally connected thereto by means of a bolt 12 equipped with a nut, an eyed ear 13 disposed superjacent the section 11. Each ear 13 has pivotally connected thereto, by means of a bolt and nut 14, the lower end 15 of one of the pair of side portions of an inverted substantially U-shaped frame member 16, the latter being formed, superjacent the ends 15, with a zygon 17 whereby to reinforce and lend rigidity to the member 16.

Interjacent of the clamps 8, the bumper 5 has detachably connected thereto an auxiliary or towing clamp or grill guard 18, the latter being of a substantially U-shaped configuration and having its rearwardly disposed side arm arranged postjacent the bumper and provided with a set screw 19 for securing the guard 18 clamped to said bumper as clearly illustrated in Figure 5. The forwardly disposed side arm of the clamp 18 is disposed prejacent the bumper 5 and extends an appreciable distance superjacent said bumper 5, said last mentioned side arm being formed, adjacent its upper end with an opening 20 for receiving therethrough the pivot bolt 12 for a purpose hereinafter set forth.

When it is desired to tow one of the vehicles by the other, the clamp 18 is removed from the bumper 5 and connected to the bumper 6 in an oppositely disposed relation with one of the clamps 8 whereupon the bolt 12 is disconnected from the other clamp 8 and the member 7 pivoted and disposed between the bumpers and the first mentioned bolt 12 connected to the clamp 18 through the opening 20 thereby enabling one of the vehicles to tow the other through the medium of my invention and their respective bumpers. From the foregoing, it will be apparent that my invention, as disclosed in Figures 1 and 2, serves an efficient guard for the front of a motor vehicle and, as disclosed in Figures 6 and 7, as a readily operated towing device for connecting the vehicles together in towing relation.

Without further elaboration the foregoing will so fully explain the invention that others may, by applying current knowledge, readily adapt the same for use under various conditions of service. Moreover, it is not indispensable that all the features of the invention be used conjointly since they may be employed advantageously in various combinations and sub-combinations.

It is obvious that the invention is not confined to the herein described use therefor as it may be utilized for any purpose to which it is adaptable. It is therefore to be understood that the invention is not limited to the specific construction as illustrated and described as the same is only illustrative of the principles of operation, which are capable of extended application in various forms, and that the invention comprehends all construction within the scope of the appended claims.

What I claim is:

1. A device of the character described comprising, a pair of clamps adapted to be secured in spatiality to the bumper of a motor vehicle, a member disposed between said clamps, detachable devices pivotally carried by said clamps respectively and pivotally connected to said member for maintaining the latter supported between said clamps for guarding said vehicle, a guard disposed between said clamps and adapted to be detachably connected to said bumper and coacting with said member to guard said vehicle, said guard detachable from said bumper for attachment to the bumper of an adjacent vehicle, one of said devices being detachable from one of said clamps for connection to said guard whereby to dispose said member in connected relation between said vehicles to constitute a towing means for said vehicles.

2. A device of the character described comprising, a pair of clamps adapted to be secured in spatiality to the bumper of a motor vehicle, a member disposed between said clamps and provided with end sections adjacent said clamps, a pair of swivels connecting said sections to said clamps respectively and maintaining said member supported between said clamps for guarding said vehicle, a guard disposed between said clamps and adapted to be detachably connected to said bumper and coacting with said member to guard said vehicle, said guard detachable from said bumper for attachment to the bumper of an adjacent vehicle, one of said swivels being detachable from one of said clamps for connection to said guard whereby to dispose said member in connected relation between said vehicles to constitute a towing means for said vehicles.

3. A combined guard and towing device comprising a pair of clamps adapted to be secured to the bumper of a vehicle, a member disposed between said clamps, a guard adapted to be detachably connected to said bumper and coacting with said member for guarding said vehicle, swivels carried by said member for connecting the latter to said clamps and with one of said swivels being detachable from its respective clamp for connection to said guard when the later is attached to the bumper of an adjacent vehicle whereby to establish a towing connection between the vehicles by said member.

4. In combination, a pair of vehicles each equipped with a bumper and with one of said bumpers disposed adjacent the other, a pair of spaced clamps and a guard secured to said bumpers respectively, a tow member interjacent said bumpers and swivelly connected at one end to one of said clamps, a swivel connecting the other end of said member to said guard to establish towing connection between said vehicles, said swivel and guard being detachable from said guard and bumper respectively, and with said guard and swivel being connectible to the other bumper and clamp respectively whereby said member and guard coact to protect the vehicle postjacent said other bumper.

HENRY E. HAWKINS, Sr.